(12) United States Patent
Zhou et al.

(10) Patent No.: US 7,352,919 B2
(45) Date of Patent: Apr. 1, 2008

(54) METHOD AND SYSTEM OF GENERATING A HIGH-RESOLUTION IMAGE FROM A SET OF LOW-RESOLUTION IMAGES

(75) Inventors: Hui Zhou, Toronto (CA); Graham Sellers, Toronto (CA); Ian Clarke, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 786 days.

(21) Appl. No.: 10/833,612

(22) Filed: Apr. 28, 2004

(65) Prior Publication Data

US 2005/0244081 A1 Nov. 3, 2005

(51) Int. Cl.
G06K 9/32 (2006.01)
(52) U.S. Cl. ....................................... 382/299; 382/299
(58) Field of Classification Search ......... 382/293–300
See application file for complete search history.

(56) References Cited

U.S. PATENT DOCUMENTS

| | | | |
|---|---|---|---|
| 5,325,449 A | 6/1994 | Burt et al. | |
| 5,511,155 A | 4/1996 | Yamaguchi | |
| 5,657,402 A | 8/1997 | Bender et al. | |
| 5,696,848 A * | 12/1997 | Patti et al. | 382/254 |
| 5,920,657 A | 7/1999 | Bender et al. | |
| 5,982,941 A | 11/1999 | Loveridge et al. | |
| 6,208,765 B1 | 3/2001 | Bergen | |
| 6,285,804 B1 | 9/2001 | Crinon et al. | |
| 6,349,154 B1 | 2/2002 | Kleihorst | |
| 6,466,618 B1 | 10/2002 | Messing et al. | |
| 2002/0122113 A1 | 9/2002 | Foote | |
| 2003/0002707 A1 | 1/2003 | Reed et al. | |

OTHER PUBLICATIONS

XP-002333488, "Achieving Accurate Image Registration as the Basis for Super-Resolution", Douglas Lim; The University of Western Australia, (pp. i-x, 1-67), (2003).

XP-002333489, "Analysis and Characterization of Super-Resolution Reconstruction Methods", S. Battiato, G. Gallo, M. Mancuso, G. Messina, F. Stanco, STMicroelectronics, Stradale Primosole 50, 95121 Catania (Italy), Catania University, D.M.I Viale A. Doria 6, 95125 Catania (Italy), (pp. 323-331), (Jan. 2003).

XP-000200576, "Improving Resolution by Image Registration", Michal Irani and Shmuel Peleg, Department of Computer Science, The Hebrew University of Jerusalem, 91904, Jerusalem, Israel, (pp. 231-239), (May 1991).

* cited by examiner

*Primary Examiner*—Jingge Wu
*Assistant Examiner*—Jayesh A Patel
(74) *Attorney, Agent, or Firm*—Mark P. Watson (57) ABSTRACT

A method of generating a high-resolution image from a set of source low-resolution images includes estimating a high-resolution image based on the set of source low-resolution images. The estimated high-resolution image is then transformed into a set of estimated low-resolution images. The set of source low-resolution images is compared with the set of estimated low-resolution images to generate a set of low-resolution errors. The set of low-resolution errors is transfomed into a set of high-resolution errors. A high-resolution error image based on the set of high-resolution errors is generated. The high-resolution error image is combined with the estimated high resolution image to yield an updated estimated high-resolution. The above steps are repeated until the updated estimated high-resolution image is of a desired quality.

21 Claims, 9 Drawing Sheets

METHOD AND SYSTEM OF GENERATING A HIGH-RESOLUTION IMAGE FROM A SET OF LOW-RESOLUTION IMAGES

FIELD OF THE INVENTION

The present invention relates generally to image processing and in particular to a method and system of generating a high-resolution image from a set of low-resolution images.

BACKGROUND OF THE INVENTION

Creating high-resolution images from sets of low-resolution images, commonly referred to as super-resolution, is known in the art and many techniques for generating such high-resolution images have been considered. For example, U.S. Pat. No. 5,696,848 to Patti et al. discloses a method of creating a high-resolution image from a sequence of low-resolution images. During the method, a low-resolution image is selected as a reference image to be reconstructed into a high-resolution image. Mapping transformations are produced to map pixels in each low-resolution image into locations of the high-resolution image using motion vectors. The accuracy of motion detection estimation for the motion vectors for each low-resolution image is detected to create an accuracy map. The mapping transformations, accuracy map, aperture time, sensor geometry, optical blur point spread function (PSF) and high-resolution sampling geometry are used to compute a blur PSF. The accuracy map, blur PSF, motion information from the mapping transformations and the low-resolution images are then used to create the high-resolution image.

U.S. Pat. Nos. 5,657,402 and 5,920,657 to Bender et al. disclose a method of creating a high-resolution still image from a plurality of low-resolution image frames. During the method, each image frame is scaled up and the transformation data is mapped into a larger data space representing the high-resolution image. Motion vectors are calculated to allow pixels in one low-resolution image frame to be mapped to the pixels in another low-resolution image frame. Pixels from one low-resolution image frame are then mapped into pixels of the next low-resolution image frame and interpolations are performed to fill spaces between points in the mapped image frames. When larger displacements between image frames occurs, pyramid data structures are used.

U.S. Pat. No. 6,285,804 to Crinon et al. discloses a method of creating a high-resolution image from multiple low-resolution images. During the method, motion vectors that map high-resolution sampling grid points to inter-pixel positions on the low-resolution images are derived. Pixels in the low-resolution images having the shortest distance to each inter-pixel position are identified. One of the identified low-resolution pixels at each high-resolution grid point is selected. Pixel intensity values are mapped to the high-resolution grid points according to the selected low-resolution pixels by interpolation.

Although the above references disclose different techniques for generating high-resolution images from sets of low resolution images, improved methods are desired.

It is therefore an object of the present invention to provide a novel method and system of generating a high-resolution image from a set of low-resolution images.

SUMMARY OF THE INVENTION

According to one aspect of the present invention there is provided a method of producing a high-resolution image from a set of low-resolution images comprising:
(a) estimating a high-resolution image based on a set of source low-resolution images;
(b) transforming the estimated high-resolution image into a set of estimated low-resolution images;
(c) comparing the set of source low-resolution images with the set of estimated low-resolution images to generate a set of low-resolution errors;
(d) transforming the set of low-resolution errors into a set of high-resolution errors;
(e) generating a high-resolution error image based on the set of high-resolution errors;
(f) combining the high-resolution error image with the estimated high resolution image to yield an updated estimated high-resolution image; and
(g) repeating steps (b) to (f) until said updated estimated high-resolution image is of a desired quality.

In one embodiment, during the generating the high-resolution errors are averaged to generate the high-resolution error image. In another embodiment, the medians of corresponding pixels in the high-resolution errors is determined and the medians used to generate the high-resolution error image. In yet another embodiment, corresponding pixels in the high-resolution errors are sorted, selected sorted pixels are discarded and the remaining corresponding pixels averaged to generate the high-resolution error image.

In one embodiment, during the estimating step the source low-resolution images are registered, averaged and then scaled to high-resolution space thereby to yield the estimated high-resolution image. The scaling is performed using a bilinear stretching method. During the registration a transform matrix for each source low-resolution image in the set is generated that projects the source low-resolution image onto a designated source low-resolution image of the set. The transform matrices are used during transformation of the estimated high-resolution image into estimated low-resolution images and during transformation of the low-resolution errors into high-resolution errors.

According to another aspect of the present invention there is provided a method of creating a high-resolution image comprising:
estimating an initial high-resolution image by interpolating the average of aligned source low-resolution images;
generating downsampled estimated low-resolution images from said initial high-resolution image;
comparing the estimated low-resolution images with the source low-resolution images and generating feedback error data; and
using the feedback error data to update the estimated high-resolution image, wherein the estimating, generating and comparing steps are iteratively performed until the estimated high-resolution image is of a desired resolution.

According to yet another aspect of the present invention there is provided a digital image editing tool for generating a high-resolution image from a set of source low-resolution images comprising:
means for estimating a high-resolution image based on the set of source low-resolution images;
first means for transforming the estimated high-resolution image into a set of estimated low-resolution images;
means for comparing the set of source low-resolution images with the set of estimated low-resolution images to generate a set of low-resolution errors;

second means for transforming the set of low-resolution errors into a set of high-resolution errors;

means for generating a high-resolution error image based on said set of high-resolution errors; and means for combining the high-resolution error image with the estimated high resolution image to yield an updated estimated high-resolution image, wherein said first transforming means, comparing means, second transforming means, generating means and combining means being operated iteratively until the updated estimated high-resolution image is of a desired quality.

According to still yet another aspect of the present invention there is provided a computer readable medium embodying a computer program for generating a high-resolution image from a set of source low-resolution images comprising:

computer program code for estimating a high-resolution image based on the set of source low-resolution images;

computer program code for first transforming the estimated high-resolution image into a set of estimated low-resolution images;

computer program code for comparing the set of source low-resolution images with the set of estimated low-resolution images to generate a set of low-resolution errors;

computer program code for second transforming the set of low-resolution errors into a set of high-resolution errors;

computer program code for generating a high-resolution error image based on said set of high-resolution errors;

computer program code for combining the high-resolution error image with the estimated high resolution image to yield an updated estimated high-resolution image; and computer program code for iteratively conditioning the first transforming, comparing, second transforming, generating and combining computer program code until the updated estimated high-resolution image is of a desired quality.

The present invention provides advantages in that high quality, high-resolution images can be generated quickly and efficiently from a set of source low-resolution images of varying quality.

BRIEF DESCRIPTION OF THE DRAWINGS

Embodiments of the present invention will now be described more fully with reference to the accompanying drawings in which.

DETAILED DESCRIPTION OF THE INVENTION

The present invention relates generally to a method and system of generating a high quality, high-resolution image from a set of registered or aligned low-resolution images, commonly referred to as super-resolution. During the method, an initial high-resolution image is estimated by interpolating the average of aligned input source low-resolution images. Simulated low-resolution images are then generated from the initial high-resolution estimate image. The simulated low-resolution images are compared with the input source low-resolution images to generate feedback error data. The feedback error data is then used to update the initial high-resolution estimate image. The above steps are performed iteratively until an estimated high-resolution image of desired quality is created.

The present invention can be embodied in a software application executed by a processing unit such as a personal computer or the like. The software application may run as a stand-alone digital image editing tool or may be incorporated into other available digital image editing applications to provide enhanced functionality to those digital image editing applications.

Figure 1:
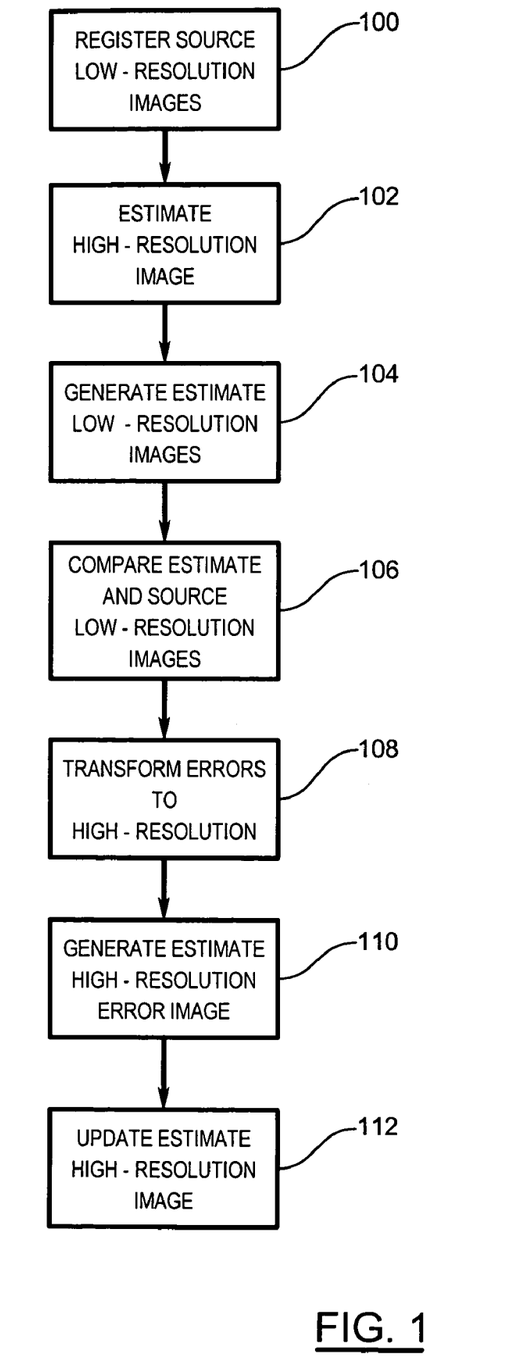
FIG. 1 is a flow chart showing the general steps performed during generation of a high-resolution image from a set of source low-resolution images.

Turning now to FIG. 1, a flow chart showing the steps performed during generation of a high-resolution image from a set or series of source low-resolution images is shown. Each low-resolution image includes a pixel matrix L of size $[L_1 \times L_2]$. Initially, the source low-resolution images in the set from which the desired high-resolution image is to be generated are registered (step 100). Once the source low-resolution images have been registered, a high-resolution image is estimated based on the registered source low-resolution images (step 102). The estimated high-resolution image includes a pixel matrix H of size $[H_1 \times H_2]$. The estimated high-resolution image is then transformed into a set of estimated low-resolution images (step 104). The set of estimated low-resolution images is then compared with the source low-resolution images to generate a set of low-resolution errors, each including a pixel matrix $E_L$ (step 106). The set of low-resolution errors is then transformed into a set of high-resolution errors, each including a pixel matrix $E_H$ (step 108). An estimated high-resolution error image is then generated from the set of high-resolution errors (step 110). The high-resolution error image includes a pixel matrix $EI_H$. The estimated high-resolution error image is combined with the high-resolution image estimated at step 102 resulting in an updated estimated high-resolution image (step 112). Steps 104 to 112 are performed iteratively until an estimated high-resolution image is generated that exhibits the desired resolution. Further specifics of the above-described method will now be described with reference to FIGS. 1 and 3.

During source low-resolution image registration at step 100, starting with the "left-most" image in the set, each low-resolution image I is registered with the next adjoining low-resolution image I' to its right in order using a feature-based registration approach. During feature-based registration of a pair of adjoining low-resolution images, features corresponding to high curvature points in the adjoining low-resolution images I and I' are extracted and corners within the features are detected. Grey-scale Harris corner detect is adopted and is based on the following operator:

$$c(x, y) = \frac{\overline{(I_x)^2} \cdot \overline{(I_y)^2} - \overline{(I_x \cdot I_y)}^2}{\overline{(I_x)^2} + \overline{(I_y)^2} + \varepsilon}$$

where:

c(x, y) is a detected corner;

y and x are the co-ordinates of a pixel in the low-resolution image assuming the top-left corner of the low-resolution image is at co-ordinate (0,0);

$I_x$ and $I_y$ indicate the directional derivatives respectively;

$\epsilon$ is a small number to avoid overflow; and $\bar{I}$ is a box filter smoothing operation on $I_x$ and $I_y$.

A 7×7 pixel window is used to filter out closed corners within a small neighbourhood surrounding each feature. The first three hundred corners c(x,y) detected in each of the adjoining low-resolution images I and I' are used. If the number of detected corners in the adjoining low-resolution images I and I' is less than three hundred, all of the detected corners are used.

For each corner c in low-resolution image I, a correlation for all corners c' in low-resolution image I' is made. This is equivalent to searching the entire low-resolution image I' for each corner c of low-resolution image I. A window centered at corner c and c' is used to determine the correlation between the corners c and c'. Normalized cross correlation NCC is used for calculating a correlation score between corners c(u,v) in low-resolution image I and corners c'(u',v') in low-resolution image I'.

The normalized cross correlation NCC is expressed as:

$$NCC(c, c') = \frac{\sum_{i=-7}^{7} \sum_{j=-7}^{7} (I(u+i, v+j) - \mu_{I'})}{\left[ \sum_{i=-7}^{7} \sum_{j=-7}^{7} (I(u+i, v+j) - \mu_{I})^2 \atop \sum_{i=-7}^{7} \sum_{j=-7}^{7} (I'(u'+i, v'+j) - \mu_{I'})^2 \right]^{1/2}}$$

The correlation score ranges from minus 1, for two correlation windows that are not similar at all, to 1 for two correlation windows that are identical. A threshold is applied to choose the matching pairs of corners. In this example, a threshold value equal to 0.6 is used although the threshold value may change for particular applications. After initial corner matching, a list of corners is obtained in which each corner c in low-resolution image I has set of candidate matching corners c' in low-resolution image I'. In this example, the maximum permissible number of candidate matching corners is set to 20, so that each corner c in low-resolution image I possibly has 0 to 20 candidate matching corners in low-resolution image I'.

Once each corner c in low-resolution image I has been matched to a set of candidate matching corners in low-resolution image I', a relaxation technique is used to disambiguate the matching corners. For the purposes of relaxation it is assumed that a candidate matching corner pair (c, c') exists where c is a corner in low-resolution image I and c' is a corner in low-resolution image I'. Let Ψ(c) and Ψ(c') be the neighbour corners of corners c and c' within a neighbourhood of N×M pixels. If candidate matching corner pair (c, c') is a good match, many other matching corner pairs (g, g') will be seen within the neighbourhood where g is a corner of Ψ(c) and g' is a corner of Ψ(c') such that the position of corner g relative to corner c will be similar to that of corner g' relative to corner c'. On the contrary, if candidate matching corner pair (c, c') is a bad match, only a few or perhaps no matching corner pairs in the neighbourhood will be seen.

A score of matching SM is used to measure the likelihood that candidate matching corners c and c' are in fact the same corners according to:

$$SM(c, c') = \sum_{g_i \in \Psi(c)} \left[ \max_{g_j' \in \Psi(c')} \frac{NCC(g_i, g_j')\delta(c, c'; g_i, g_j')}{K + dist(c, c'; g_i, g_j')} \right]$$

where:

NCC(g,g') is the correlation score described above;

K=5.0 is a constant weight;

$dist(c,c';g_i,g_j') = [d(c,g_i) + d(c',g_j')]/2$, with $d(c,g_i)$ being the Euclidean distance between corners c and $g_i$ and $d(c',g_j')$ being the Euclidean distance betweeen corners c' and $g_j'$; and $$\delta(c, c'; g, g') = \begin{cases} e^{-r/\lambda} & \text{if} (g, g') \text{ is a candidate match and } r < \lambda \\ 0 & \text{otherwise} \end{cases}$$

in which, $$r = \frac{|d(c_i, g_i) - d(c', g_j')|}{dist(c, c'; g_i, g_j')}; \text{ and}$$

λ=0.3 is a threshold based on the relative distance difference.

It is assumed that the angle of rotation in the image plane is less than 60 degrees. The angle between vectors $\vec{a}$ and $\vec{a'}$ is checked to determine if it is larger than 60 degrees and if so, δ(c, c'; g, g') takes the value of 0. The candidate matching corner c' in the set that yields the maximum score of matching SM is selected as the matching corner.

Following performance of the above relaxation technique, a list of matching corners exists without ambiguity such that a corner c of low-resolution image I only corresponds to one corner c' in low-resolution image I' thereby to yield a registration matrix for each low-resolution image I that registers the corners c in low-resolution image I to corresponding corners c' in adjoining low-resolution image I'.

With the corners c and c' in the adjoining low-resolution images I and I' registered, a transform based on the list of matching corners for each pair of adjoining low-resolution images is estimated thereby to yield a transform matrix M. Since there may be a large number of false corner matches, especially if the two adjoining low-resolution images I and I' have small overlapping parts, a robust transform estimating technique is used.

In this example, a projective transform is used to estimate the transform detailing the transformation between each pair of adjoining low-resolution images. Alternatively, an affine transform or a translation may be used to estimate the transform if only non-projective motion in the set of source low-resolution images exists. As will be appreciated, estimating an affine transform or a translation is easier and thus faster than estimating a projective transform.

During projective transform estimation, a random sample consensus algorithm (RANSAC) based technique is used. Initially, N pairs of matching corners are chosen from the registration matrix and a projective transform detailing the transformation between the matching corners is estimated by solving a set of linear equations modelling the projective transform. The estimated projective transform is then evaluated by examining the support from other pairs of matching corners. This process is performed using other sets of randomly chosen N pairs of matching corners. The projective transform that supports the maximum number of corner matches is selected. In particular, the above-described process is carried out following the procedure below:
1. MaxN←0
2. Iteration←1
3. For each set of randomly chosen N pairs of matching corners, perform steps 4 to 10
4. Iteration←Iteration+1
5. If (Iteration>MaxIteration), go to step 11.
6. Estimate the projective transform by solving the appropriate set of linear equations
7. Calculate N, the number of matched corner pairs supporting the projective transform
8. If (N>MaxN), perform steps 9 and 10; else go to step 3
9. MaxN←N
10. Optimal Transform←Current Transform
11. if (MaxN>5), return success; otherwise return failure.

Theoretically, to estimate the projective transform, only four pairs of matching corners are needed. It is possible that a pair of matching corners is dependent, which makes the matrix singular. To avoid this, at least five pairs of matching corners are required for a successful projective transform estimation to be determined. A least squares LSQR solver is used to solve the set of linear equations and a heuristic constraint is applied. That is, if the estimated projective transform matrix is not satisfied by the heuristic constraint, then it is assumed the projective transform estimation is bad and there should be no matching corners supporting it. For transform matrix M having the form:

$$M = \begin{bmatrix} a_{11} & a_{12} & a_{13} \\ a_{21} & a_{12} & a_{23} \\ a_{31} & a_{12} & 1.0 \end{bmatrix},$$

Then M should satisfy the following constraint:

$|a_{11}| \in (0.5, 1.7), |a_{12}| < 0.8, |a_{13}| < W,$ $|a_{21}| < 0.8, |a_{12}| \in (0.5, 1.7), |a_{23}| < H,$ $|a_{31}| < 0.1, |a_{23}| < 0.1.$ in which, W and H are the width and height of the image, respectively.

The maximum number of iterations (MaxIteration) is given heuristically too. In this example, the maximum number of iterations follows the equation:

$P = 1 - [1 - (1-\chi)^\eta]^m,$ where:
P is the probability to ensure there is a correct solution;
$\chi$ is the percentage of false matching corner pairs;
$\eta$ is the number of matching corners needed for a solution (eight for affine and ten for projective); and
m is the maximum number of random iterations.

To speed up the approach, a two-step estimation is used. Initially, a maximum number of 250 iterations for projective transform estimation is performed. If the estimation fails, 2000 iterations are performed for projective transform estimation. If the estimation process still does not succeed, a translation is estimated as will now be described.

During translation estimation, it is necessary to determine two parameters dx and dy which only need one pair of matching corners. Considering that there may be many false corner matches, the following routine is performed to determine the translation:
1. MaxN←0
2. For each pair of matched corners, perform steps 2 to 7
3. Calculate translation between matched corners
4. Calculate N, the number of matched corner pairs supporting the translation
5. If (N>MaxN), perform steps 5 to 7; else go to step 2
6. MaxN←N
7. Optimal Translation←Current Translation
8. if (MaxN>3), return success; otherwise return failure.

The above procedure estimates the translation supported by the maximum number of matched corner pairs. A matched corner pair supports the translation if and only if the translated corner in low-resolution image I' falls within a 3×3 pixel neighbourhood of its corresponding corner in the low-resolution image I.

If an affine transform is to be estimated a similar procedure to that described with respect to projective transform estimation is performed, using the appropriate set of linear equations that model the affine transform. Theoretically to estimate the affine transform only three pairs of matching corners are needed. To avoid the situation where a pair of matching corners is dependent resulting in a singular matrix, at least four pairs of matching corners are required for a successful affine transform estimation to be determined. During the two-step estimation approach, a maximum number of 100 iterations is initially performed. If the estimation fails, 1000 iterations are performed. If the estimation process still does not succeed, the translation is estimated.

Figure 2:
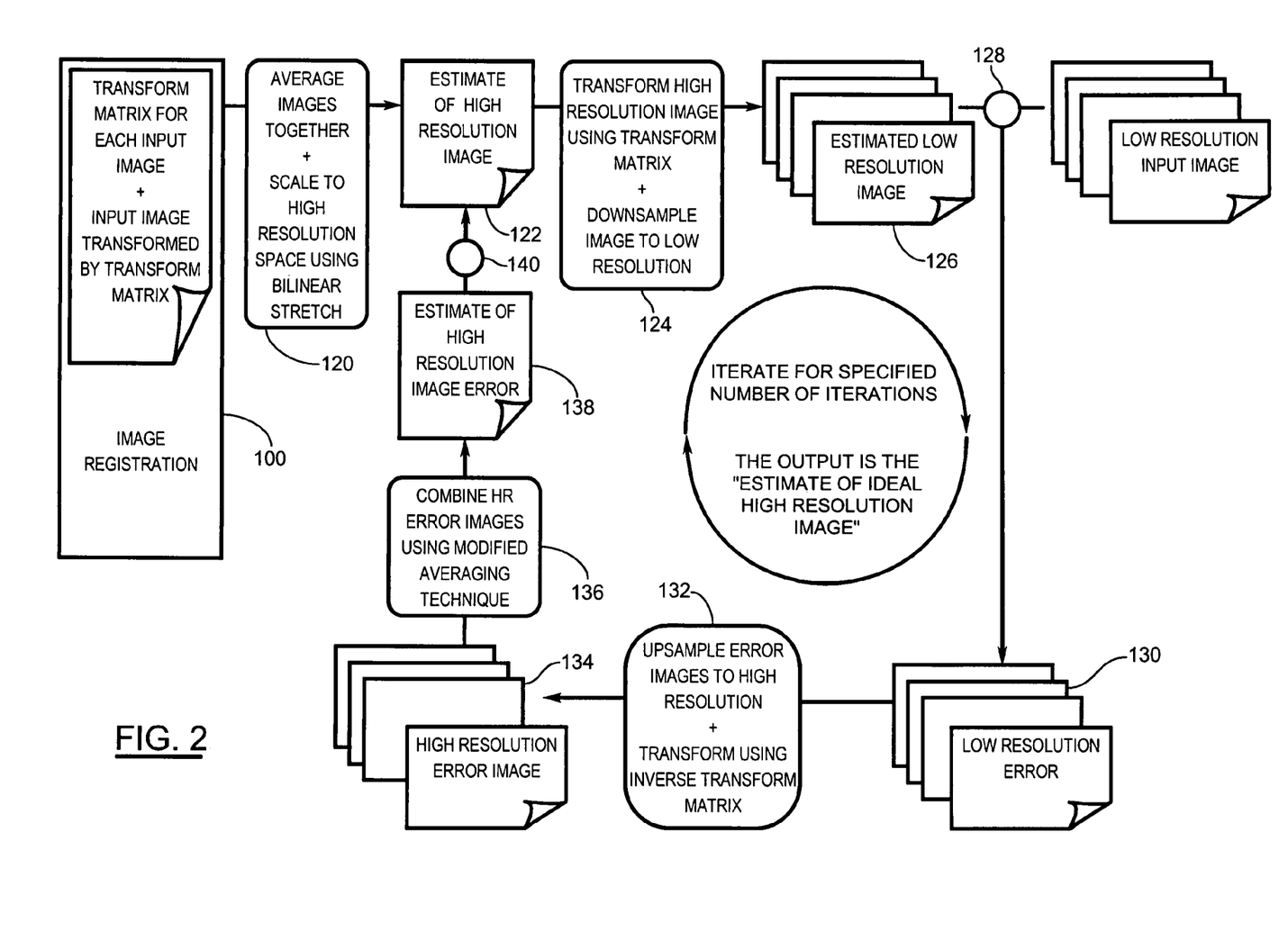
FIG. 2 is a diagram showing the steps performed during generation of a high-resolution image from a set of source low-resolution images.

With the source low-resolution images registered, during step 102 the registered source low-resolution images are averaged and the resultant averaged image is scaled to high-resolution space using a bilinear stretching method (step 120) thereby to yield the initial estimated high-resolution image (step 122).

Figure 3:
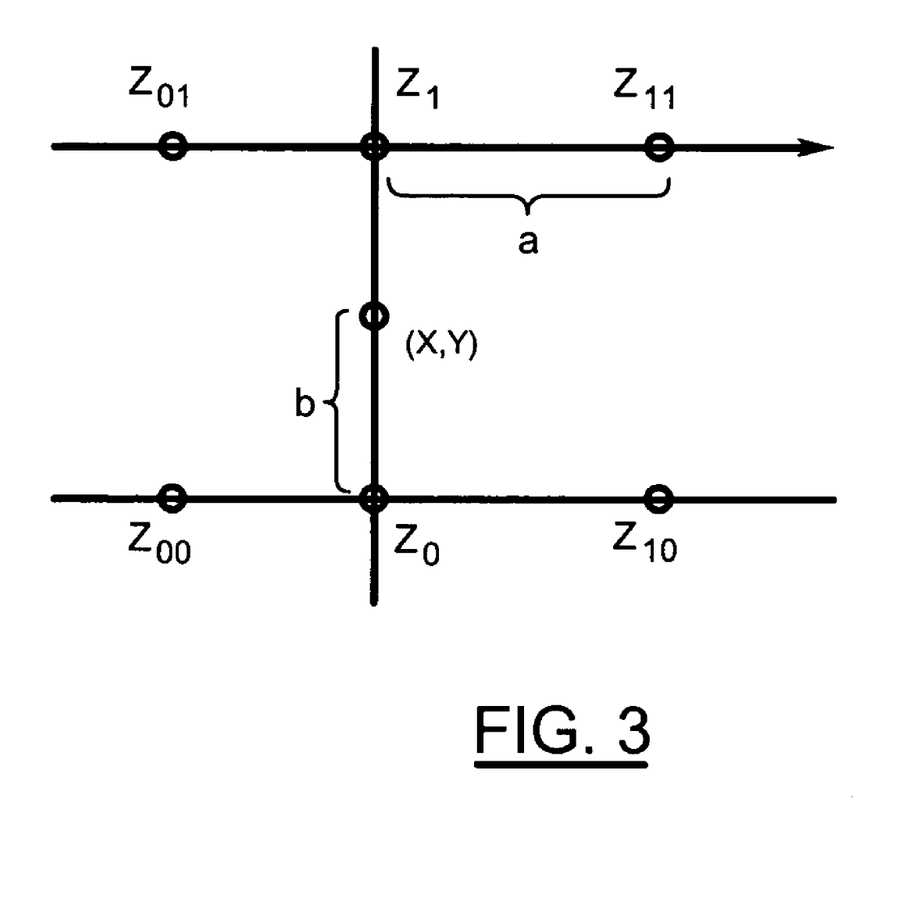
FIG. 3 illustrates bilinear interpolation of a pixel p(x,y)
Figure 4:
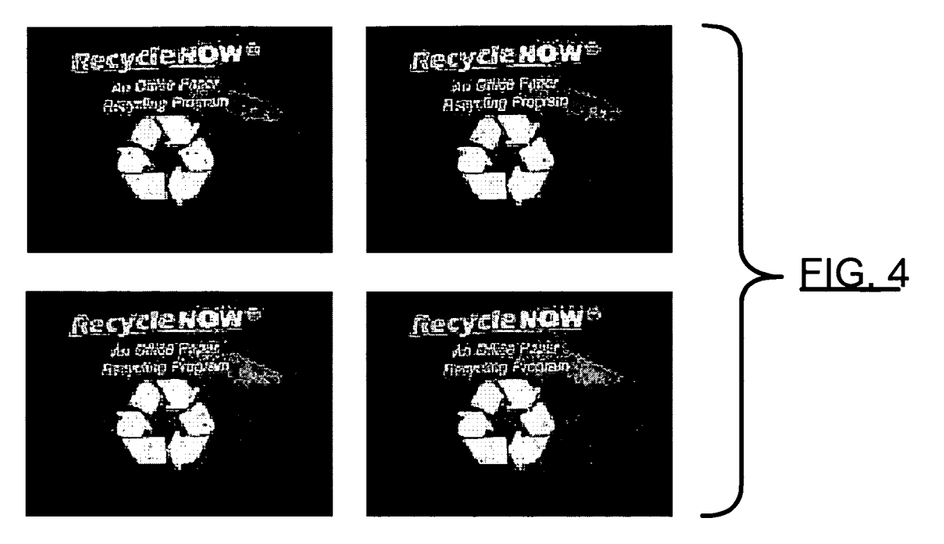
FIGS. 4 to 11 show the results at various steps during creation of a high-resolution image from a set of source low-resolution images.

During bilinear stretching, the resultant averaged image is stretched by filling in undefined pixels through bilinear interpolation. During bilinear interpolation, a linear interpolation is made along each pixel row of the resultant averaged image followed by a linear interpolation down each column of the resultant averaged image. Each estimated pixel in the initial estimated high-resolution image is therefore a weighted combination of its four nearest neighbors in the resultant averaged image. For example, for a pixel p(x,y) to be interpolated, the intensity Z of pixel p(x,y) according to bilinear interpolation is interpolated as follows:

$Z_1 = (1-a)*Z_{01} + a*Z_{11};$ $Z_0 = (1-a)*Z_{00} + a*Z_{10};$ and $Z = (1-b)*Z_1 + b*Z_0;$ where:
a and b are the distances as illustrated in FIG. 3; and
$Z_{00}, Z_{01}, Z_{10}$ and $Z_{11}$ are the intensities of the four nearest neighbor pixels to pixel p(x,y) being interpolated.

During step 104, the estimated high-resolution image is transformed into the set of estimated low-resolution images by firstly multiplying the transform matrices M generated during image registration on the estimated high-resolution image matrix H to generate transformed images and then by downsampling the transformed images to low-resolution space (step 124) thereby to yield the set of estimated low-resolution images (step 126).

At step 106, each estimated low-resolution image is subtracted from its corresponding source low-resolution image (step 128) to yield a low-resolution error for that estimated low-resolution image (step 130).

At step 108, each low-resolution error is upsampled to high-resolution space. The upsampled low-resolution errors are then transformed into a set of high-resolution errors by applying the inverses of the transform matrices M generated during image registration on the upsampled low-resolution errors (step 132), thereby to yield the set of high-resolution errors (step 134).

At step 110, the high-resolution errors are combined and averaged (step 136) to determine the mean of the pixels in the high-resolution errors thereby to yield the estimated high-resolution error image (step 138). The estimated high-resolution error image is then added to the estimated high-resolution image (step 140) thereby to update the estimated high-resolution image.

If desired, the combining and averaging of the high-resolution errors can be modified. For example, if desired, the medians of corresponding pixels in the high-resolution errors can be calculated and the medians used to yield the estimated high-resolution error image. Alternatively, corresponding pixels in the high-resolution errors can be sorted in order and the highest and lowest pixels discarded so that only the intermediate pixels in the high-resolution errors are averaged to yield the estimated high-resolution error image.

Figure 5:
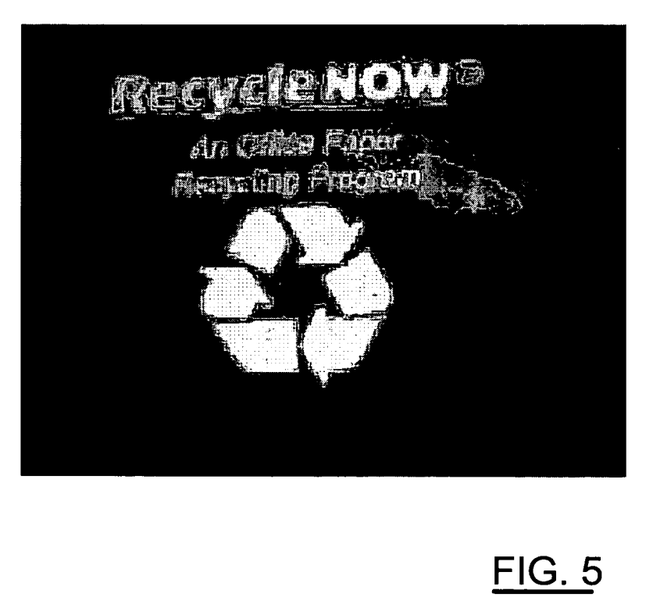

FIGS. 4 to 11 show the results at the various steps of the high-resolution image generating method during processing of a set of four source low-resolution images (see FIG. 4) to generate a high-resolution image. FIG. 5 shows a high-resolution image estimated from the source low-resolution images of FIG. 4 after the low-resolution images have been registered and then scaled to high-resolution space (steps 100 and 120).

Figure 6:
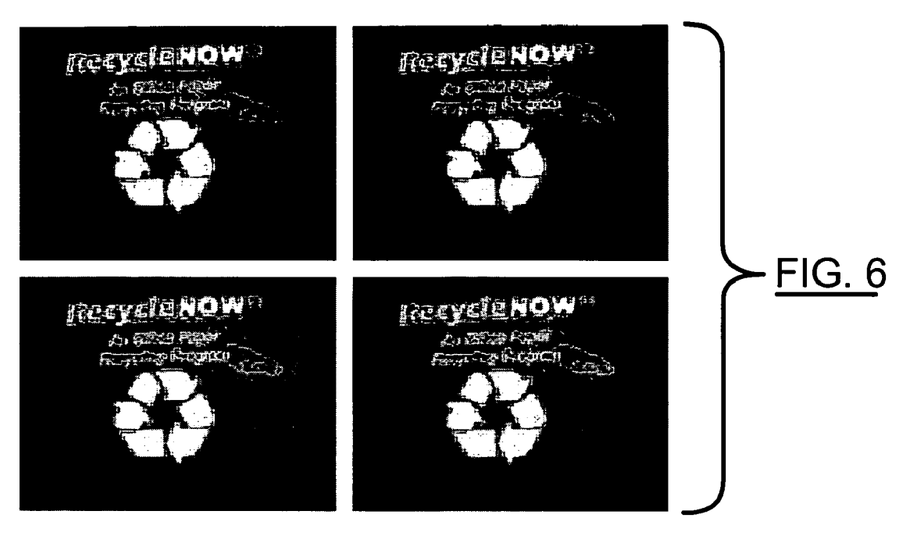
Figure 7:
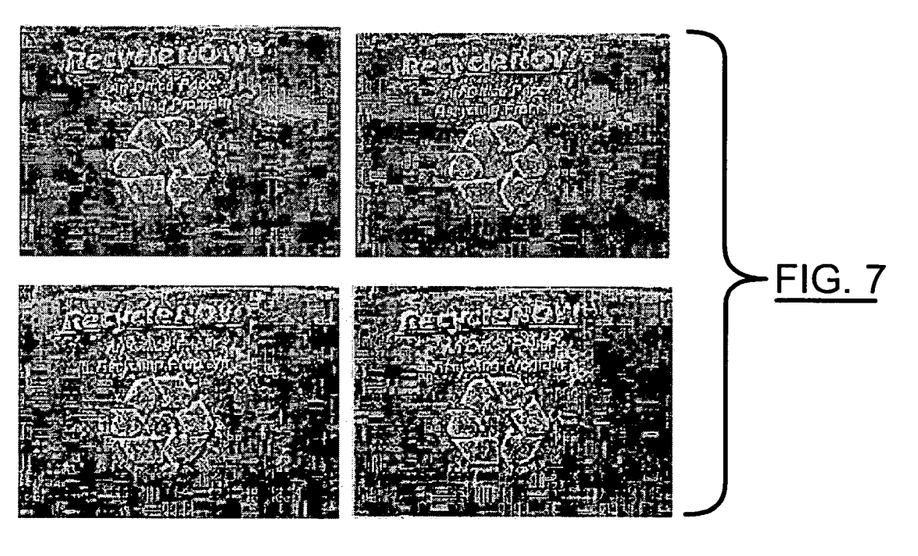
Figure 8:
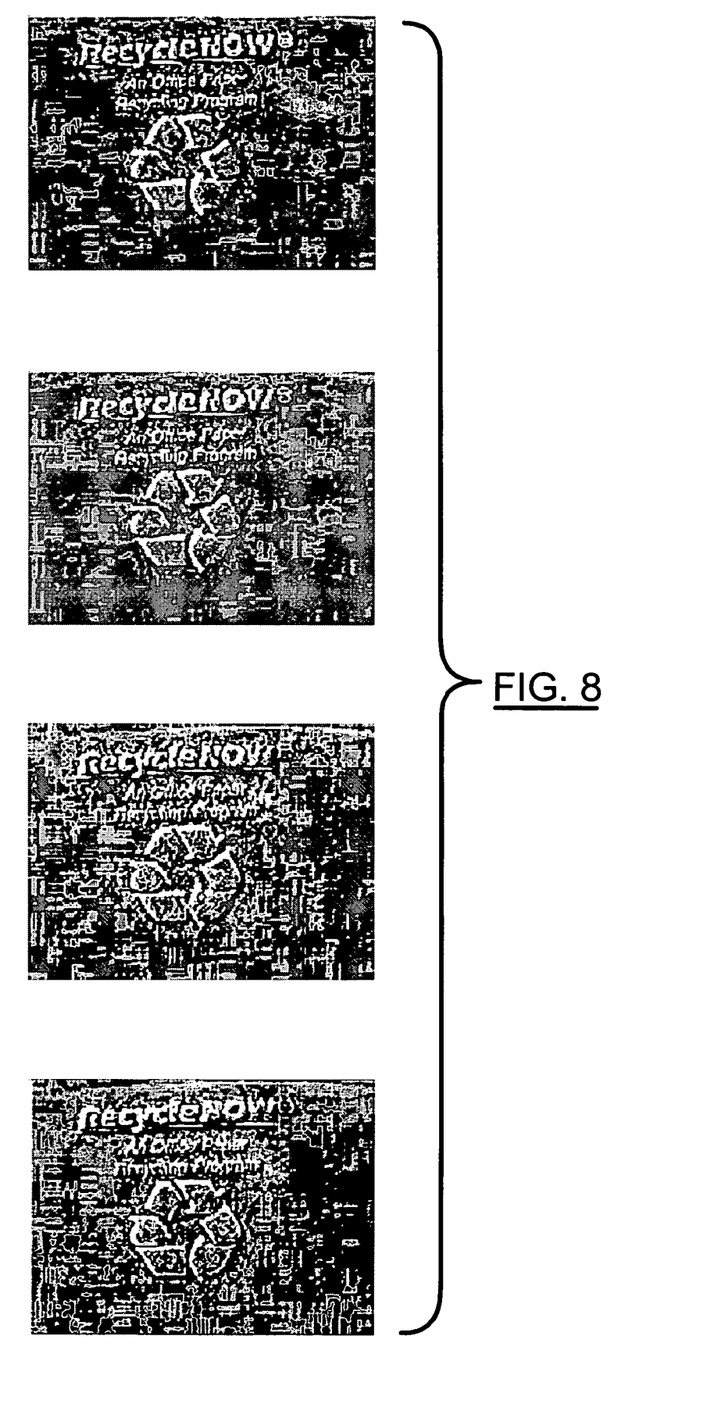
Figure 9:
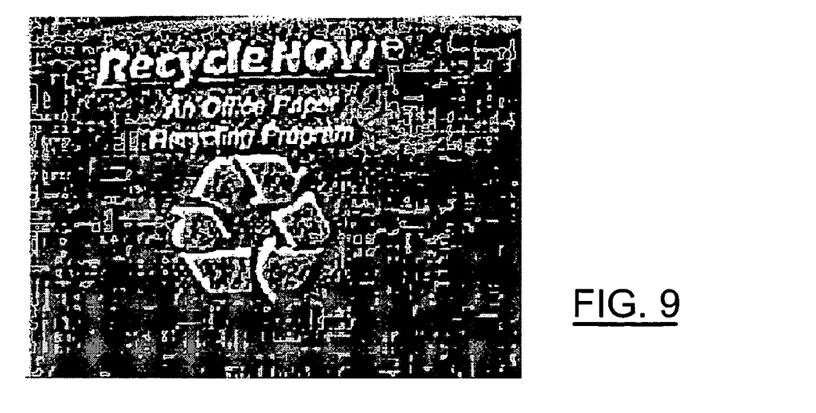
Figure 10:
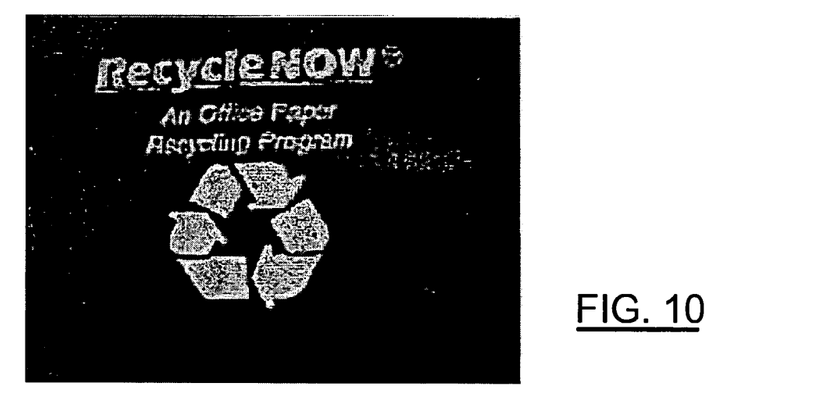
Figure 11:
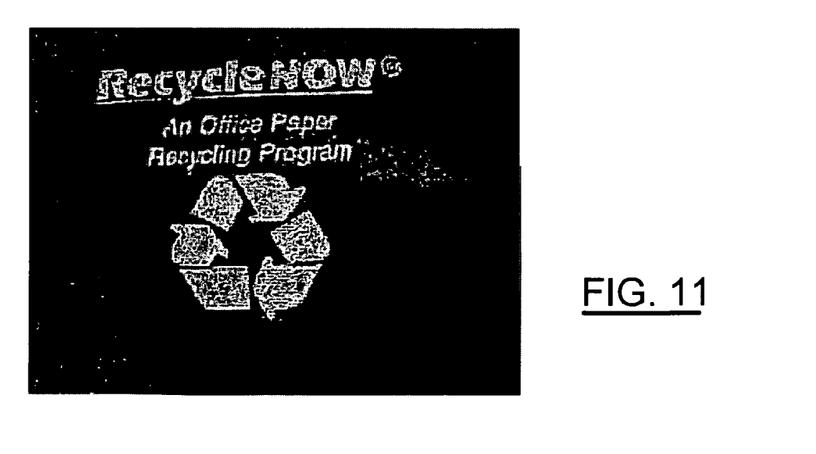

FIG. 6 shows the resultant set of estimated low-resolution images 126 generated by transforming and downsampling the estimated high-resolution image (step 124). FIG. 7 shows the low-resolution errors 130 generated by subtracting the estimated low-resolution images of FIG. 6 from the source low-resolution images of FIG. 4 (step 128). FIG. 8 shows the high-resolution errors 134 generated by upsampling and transforming the low-resolution errors of FIG. 7 (step 132). FIG. 9 shows the estimated high-resolution error image 138 generated from the high-resolution errors of FIG. 8 (step 136) and FIG. 10 shows the updated estimated high-resolution image generated by combining the estimated high-resolution error image of FIG. 9 with the estimated high-resolution image of FIG. 5. FIG. 11 shows the updated estimated high-resolution image following five (5) iterations of steps 102 to 112.

Figure 12:
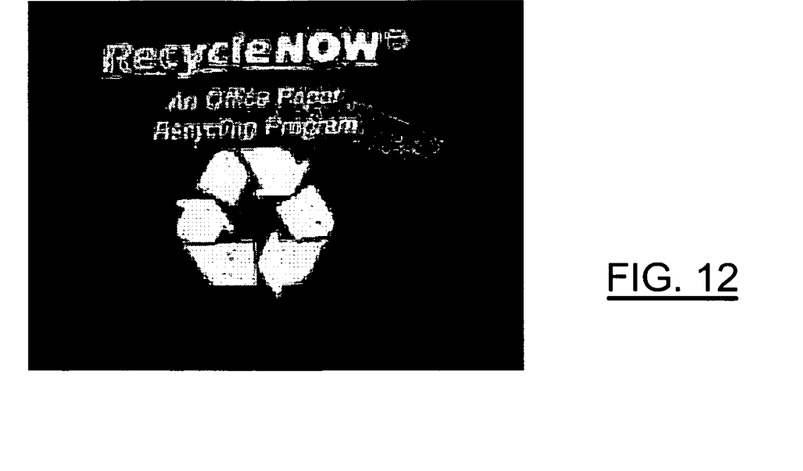
FIGS. 12 to 14 show the results when an alternative high-resolution error processing method is used to generate a high-resolution error image.
Figure 13:
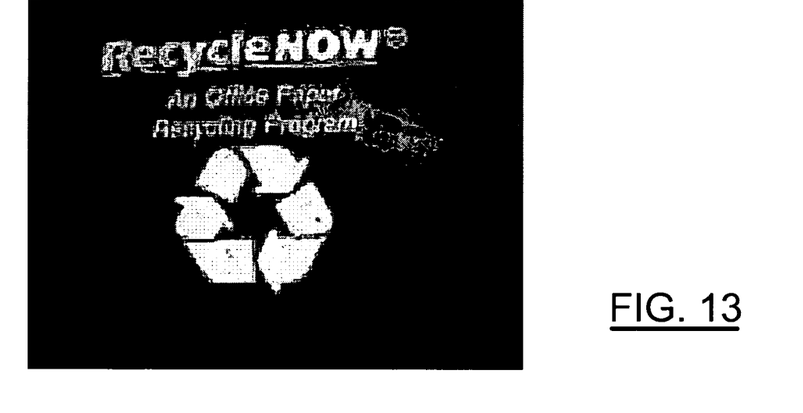
Figure 14:
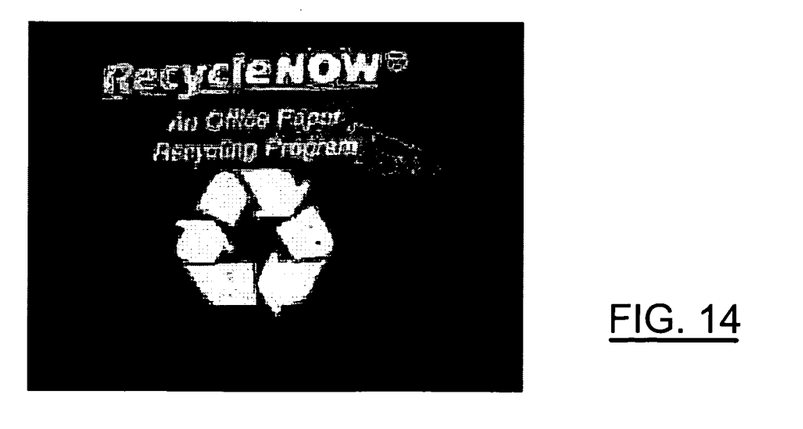

FIG. 12 shows the estimated high-resolution error image generated at step 136 from the high-resolution errors of FIG. 8 when the medians of the pixels in the high-resolution errors are calculated and averaged. FIG. 13 shows the updated estimated high-resolution image generated by combining the high-resolution error image of FIG. 12 with the estimated high-resolution image of FIG. 5. FIG. 14 shows the updated estimated high-resolution image following five (5) iterations of steps 102 to 112.

Figure 15:
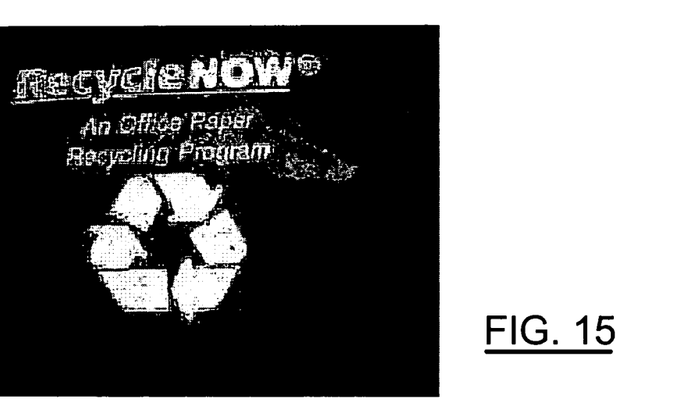
FIGS. 15 to 17 show the results when yet another alternative high-resolution error processing method is used to generate a high-resolution error image.
Figure 16:
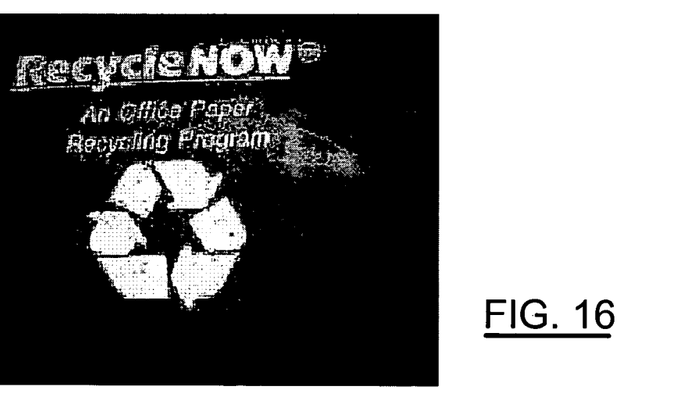
Figure 17:
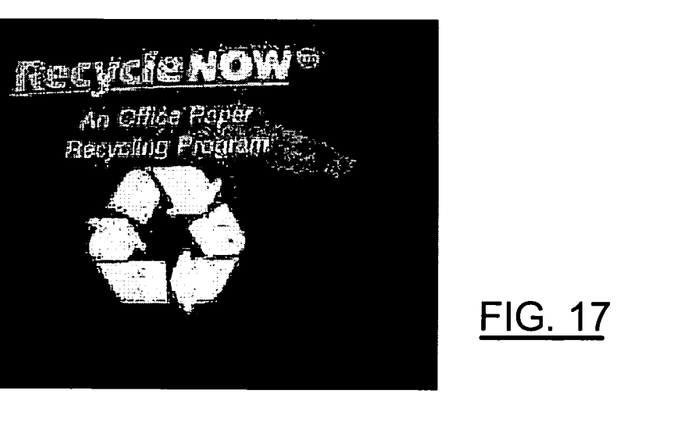

FIG. 15 shows the estimated high-resolution error image generated at step 136 from the high-resolution errors of FIG. 8 when the pixels in the high-resolution errors are sorted in order and the highest and lowest pixels are discarded so that only the intermediate pixels in the high-resolution errors are averaged. FIG. 16 shows the updated estimated high-resolution image generated by combining the high-resolution error image of FIG. 15 with the estimated high-resolution image of FIG. 5. FIG. 17 shows the updated estimated high-resolution image following five (5) iterations of steps 102 to 112.

As will be appreciated, the present invention allows high-quality, high-resolution images to be generated from a set of source low-resolution images quickly and efficiently. By controlling the number of iterations, high-resolution images of the desired quality can be obtained.

The present invention can be embodied as computer readable program code stored on a computer readable medium. The computer readable medium is any data storage device that can store data, which can thereafter be read by a computer system. Examples of computer readable medium include read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments of the present invention have been described, those of skill in the art will appreciate that variations and modifications may be made without departing from the spirit and scope thereof as defined by the appended claims.

What is claimed is:

1. A method of generating a high-resolution image from a set of source low-resolution images comprising:
   (a) estimating a high-resolution image based on the set of source low-resolution images;
   (b) transforming the estimated high-resolution image into a set of estimated low-resolution images;
   (c) comparing the set of source low-resolution images with the set of estimated low-resolution images to generate a set of low-resolution errors;
   (d) transforming the set of low-resolution errors into a set of high-resolution errors;
   (e) generating a high-resolution error image based on the set of high-resolution errors;
   (f) combining the high-resolution error image with the estimated high resolution image to yield an updated estimated high-resolution image; and
   (g) repeating steps (b) to (f) until the updated estimated high-resolution image is of a desired quality; and
   wherein during said estimating, the source low-resolution images are registered, averaged and then scaled to high-resolution space thereby to yield said estimated high-resolution image;
   wherein during registering of said low-resolution images, matching corners in adjoining low-resolution images I and I' are determined and a transform between each adjoining pair of low-resolution images based on said matching corners is estimated; and
   wherein registering each pair of adjoining low-resolution images I and I' comprises:
      extracting features in each of said low-resolution images I and I' corresponding to high curvature points therein;
      determining corners adjacent said features; and
      matching the corners of low-resolution image I to corresponding corners of low-resolution image I' thereby to register said low-resolution images I and I'.

2. The method of claim 1 wherein during said generating the high-resolution errors are averaged to generate said high-resolution error image.

3. The method of claim 1 wherein the medians of corresponding pixels in the high-resolution errors is determined and the medians used to generate said high-resolution error image.

4. The method of claim 2 wherein corresponding pixels in the high-resolution errors are sorted, selected sorted pixels are discarded and the remaining corresponding pixels averaged to generate said high-resolution error image.

5. The method of claim 4 wherein the selected sorted pixels are the highest and lowest sorted pixels.

6. The method of claim 1 wherein scaling is performed using a bilinear stretching method.

7. The method of claim 1 wherein during said registration, a transform matrix for each source low-resolution image in said set is generated that projects said source low-resolution image onto a designated source low-resolution image of said set.

8. The method of claim 7 wherein said transforming at step (b) comprises:
    transforming the estimated high-resolution image using said transform matrices; and
    downsampling the transformed estimated high-resolution images thereby to yield said set of estimated low-resolution images.

9. The method of claim 8 wherein said transforming at step (d) comprises:
    upsampling the low-resolution errors; and
    transforming the upsampled low-resolution errors using inverses of said transform matrices thereby to yield said set of high-resolution errors.

10. The method of claim 9 wherein during said generating, the high-resolution errors are averaged to generate said high-resolution error image.

11. The method of claim 9 wherein the medians of corresponding pixels in the high-resolution errors is determined and the medians used to generate said high-resolution error image.

12. The method of claim 9 wherein corresponding pixels in the high-resolution errors are sorted, selected sorted pixels are discarded and the remaining corresponding pixels averaged to generate said high-resolution error image.

13. The method of claim 12 wherein the selected sorted pixels are the highest and lowest sorted pixels.

14. The method of claim 1 wherein during said determining, corners within a neighbourhood surrounding said features are detected.

15. The method of claim 14 wherein said determining is performed until a threshold number of corners is detected.

16. The method of claim 15 wherein during said matching, each detected corner in low-resolution image I' is compared with each detected corner in low-resolution image I to determine matching corners in said low-resolution images I and I'.

17. The method of claim 16 wherein said comparing includes the steps of:
    determining the correlation between each detected corner in low-resolution image I' with each detected corner in low-resolution image I to yield a list of corners in which each corner in low-resolution image I has a set of candidate matching corners in low-resolution image I';
    measuring the likelihood that each of the candidate matching corners in said set corresponds to the associated corner in low-resolution image I; and
    selecting one of the candidate matching corners in said set.

18. The method of claim 17 wherein during said correlation determining, a normalized cross correlation is used to calculate a correlation score between each detected corner in low-resolution image I' with each detected corner in low-resolution image I, correlation scores above a threshold level signifying a candidate matching corner.

19. The method of claim 18 wherein said correlation determining is performed until a threshold number of candidate matching corners is determined thereby to form said set.

20. The method of claim 19 wherein during said measuring, a score of matching is used to measure the likelihood that each of the candidate matching corners in said set corresponds to the associated corner in low-resolution image I based on other matching corner pairs within a neighbourhood surrounding the corners being matched.

21. A computer readable medium embodying a computer program for generating a high-resolution image from a set of source low-resolution images comprising:
    computer program code for estimating a high-resolution image based on the set of source low-resolution images;
    computer program code for first transforming the estimated high-resolution image into a set of estimated low-resolution images;
    computer program code for comparing the set of source low-resolution images with the set of estimated low-resolution images to generate a set of low-resolution errors;
    computer program code for second transforming the set of low-resolution errors into a set of high-resolution errors;
    computer program code for generating a high-resolution error image based on said set of high-resolution errors;
    computer program code for combining the high-resolution error image with the estimated high resolution image to yield an updated estimated high-resolution image; and
    computer program code for iteratively conditioning the first transforming, comparing, second transforming, generating and combining computer program code until the updated estimated high-resolution image is of a desired quality; and
    wherein during said estimating, the source low-resolution images are registered, averaged and then scaled to high-resolution space thereby to yield said estimated high-resolution image;
    wherein during registering of said low-resolution images, matching corners in adjoining low-resolution images I and I' are determined and a transform between each adjoining pair of low-resolution images based on said matching corners is estimated; and
    wherein registering each pair of adjoining low-resolution images I and I' comprises:
        extracting features in each of said low-resolution images I and I' corresponding to high curvature points therein;
        determining corners adjacent said features; and
        matching the corners of low-resolution image I to corresponding corners of low-resolution image I' thereby to register said low-resolution images I and I'.

* * * * *